(12) United States Patent
Powell et al.

(10) Patent No.: US 6,496,547 B1
(45) Date of Patent: Dec. 17, 2002

(54) DIGITAL FM RECEIVER EMPLOYING COMBINED SAMPLE-AND-HOLD AND INTEGRATE-AND-DUMP DETECTORS FOR IMPROVED BIT ERROR RATES

(75) Inventors: Robert F. Powell, San Diego, CA (US); Aladino D. Sorgi, San Diego, CA (US)

(73) Assignee: Cubic Defense Systems, Inc., San Diego, CA (US)

(*) Notice: Subject to any disclaimer, the term of this patent is extended or adjusted under 35 U.S.C. 154(b) by 0 days.

(21) Appl. No.: 09/451,343

(22) Filed: Nov. 30, 1999

(51) Int. Cl.[7] ............................................. H04L 27/06

(52) U.S. Cl. .................. 375/316; 375/340; 329/327; 329/341; 455/42; 455/205

(58) Field of Search ............................ 375/316, 337, 375/340, 349; 455/42, 205; 329/315, 327, 341

(56) References Cited

U.S. PATENT DOCUMENTS

| | | | | | |
|---|---|---|---|---|---|
| 4,024,540 | A | * | 5/1977 | Ofverberg | 342/102 |
| 4,222,115 | A | * | 9/1980 | Cooper et al. | 370/475 |
| 4,290,140 | A | | 9/1981 | Malm | 375/46 |
| 4,509,017 | A | * | 4/1985 | Andren et al. | 329/308 |
| 4,641,318 | A | * | 2/1987 | Addeo | 375/260 |
| 4,644,523 | A | * | 2/1987 | Horwitz | 370/479 |
| 4,782,489 | A | | 11/1988 | Moulsiey | 371/30 |
| 5,132,985 | A | | 7/1992 | Hashimoto et al. | 375/1 |
| 5,297,170 | A | | 3/1994 | Eyubogiu et al. | 375/25 |
| 5,610,944 | A | | 3/1997 | Mau et al. | 375/260 |
| 5,754,585 | A | | 5/1998 | Durrant et al. | 375/206 |
| 5,784,417 | A | | 7/1998 | Alamouti | 375/341 |
| 5,787,129 | A | | 7/1998 | Willming | 375/346 |

OTHER PUBLICATIONS

R.F. Pawula, "On the Theory of Error Rates for NarrowBand Digital FM", *IEEE Transactions on Communications*, vol. Com–29, No. 11, pp 1634–1643, Nov. 1981.
M.K. Simon, "The Impact of Mismatch of the Performance of Coded Narrow–Band FM with Limiter/Discriminator Detection," *IEEE Transactions on Communications*, vol. Com–31, No. 1, pp 28–36, Jan., 1983.
I. Bar–David, "On the Rice Model of Noise in FM Receivers," *IEEE Transactions on Information Theory*, vol. 34, No. 6, pp. 1406–1419, Nov., 1988.
A. Wittneben, "FMP: A New Digital FM Scheme with Optimized Noncoherent Detectabilibility and Inherent Insensitivity to Fadings," *IEEE*, CH2379–1/89/000/0256, pps. 256–262, 1989.
J. Yang, K. Feher, "An Improved $\pi/4$–QPSK with Nonredundant Error Correction for Satellite Mobile Broadcasting," *IEEE Transactions on Broadcasting*, vol. 37, No. 1, pps. 9–16, Mar. 1991.

(List continued on next page.)

Primary Examiner—Don N. Vo
(74) Attorney, Agent, or Firm—Michael H. Jester

(57) ABSTRACT

A narrow-band digital frequency-modulation (FM) limiter-discriminator (LD) receiver with two independent detectors that combine to remove most of the bit errors caused by FM-clicks in an encoded channel. The output of the LD circuit is presented to a sample-and-hold (S&H) detector and to an integrate and dump (I&D) detector. Because the S&H and I&D detector outputs are offset in time by one-half bit and they are not entirely correlated, an error in one does not necessarily imply an error in the other. Using convolutional coding and Viterbi decoding, with threshold-compensation of the I&D detector output and threshold- or envelope-compensation of the S&H detector output, averaging the two compensated detector signals improves the receiver bit error rate (BER) performance by more than 3 dB over the soft-decision thresholded I&D detector alone, which until now was believed to be optimum in the art.

42 Claims, 4 Drawing Sheets

OTHER PUBLICATIONS

K.A. Farrell and P.J. McLane, "Performance of the Cross-Correlator Receiver for Binary Digital Frequency Modulation," *IEEE*, 0–7803–1820/94, pps. 349–353, 1994.

Y. Iwanami, "Performande of Sequence Estimation Scheme of Narrowband Digital FM Signals with Limiter–Discriminator Detection," *IEEE Journal on Selected Areas of Communications*, vol. 13, No. 2, pps. 310–315, Feb., 1995.

H.M. Kwon, H. Yue, W. Huo and I. Hyun, "Improved Zero–Crossing Demodulator for Minimum Shift Keying Under Static Environments," *IEEE*, 0–7803–2509–5/95, pps. 1024–1028, May, 1995.

B.S. Son and I.S. Lee, "A Digital FM Demodulator for FM, TV, and Wireless," *IEEE Transactions on Circuits and Systems– II: Analog and Digital Signal Processing*, vol. 42, No. 12, pps. 821–825, Dec., 1995.

I.M. Kwon and K.B. Lee, "A Novel Digital FM Receiver for Mobile and Personal Communications," *IEEE Transaction on Communications*, vol. 44, No. 11, pps. 1466–1476, Nov. 1996.

T. Ekvetchavit and Z. Zvonar, "Performance of Phaselocked Loop Receiver in Digital FM Systems," *IEEE*, 0–7803–4872–9/98, pps. 381–385, Sep., 1998.

R.F. Pawula, "Generic Error Probabilities," *IEEE Transactions on Communications*, vol. 47, No. 5, pps. 697–702, May, 1999.

* cited by examiner

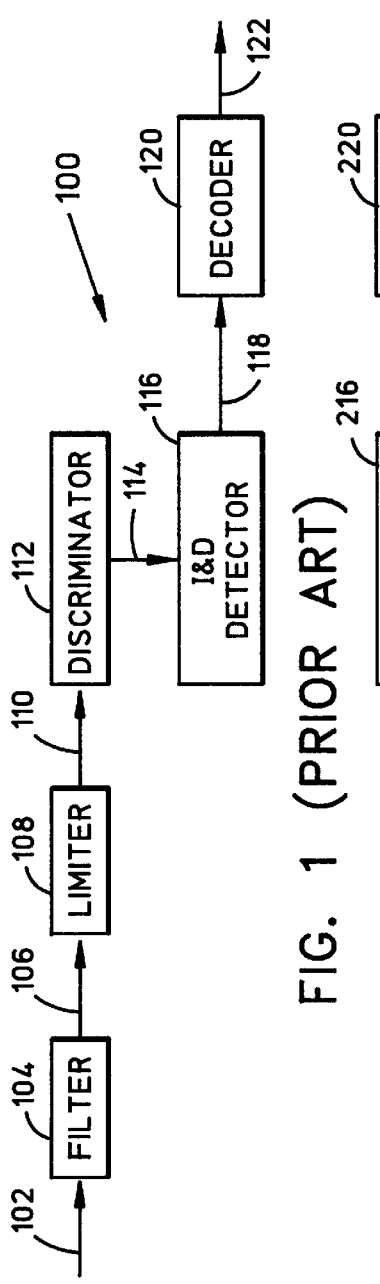
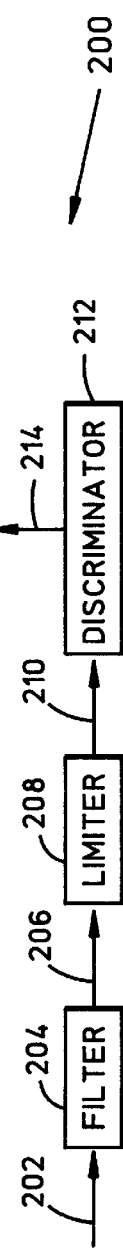
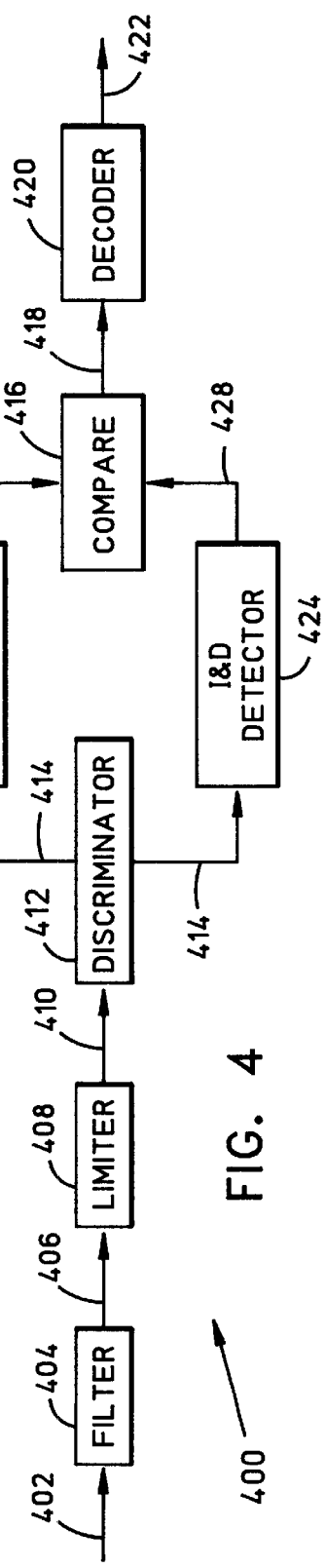
FIG. 1 (PRIOR ART)
FIG. 2 (PRIOR ART)
FIG. 4

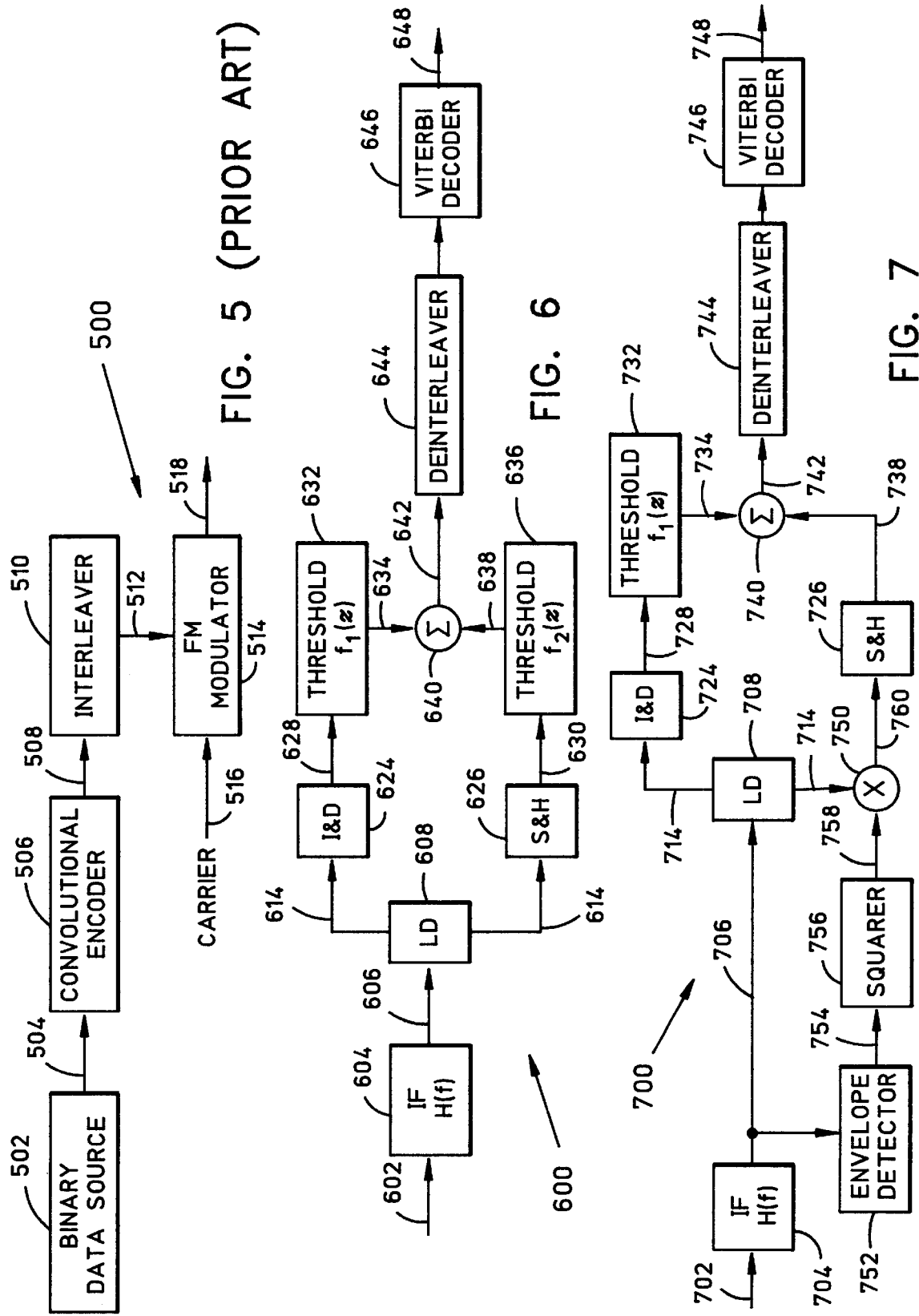

DIGITAL FM RECEIVER EMPLOYING COMBINED SAMPLE-AND-HOLD AND INTEGRATE-AND-DUMP DETECTORS FOR IMPROVED BIT ERROR RATES

BACKGROUND OF THE INVENTION

1. Field of the Invention

This invention relates generally to narrow-band digital frequency-modulated (FM) limiter-discriminator (LD) receivers and, more particularly, to a digital FM LD receiver that averages the outputs of two detectors to eliminate the effects of FM-clicks on bit error rates (BERs) for encoded digital signals.

2. Description of the Related Art

The FM-click-and-Gaussian noise model for frequency-modulation (FM) receivers is well-known in the electronic arts, having been introduced by Rice in a seminal 1963 paper (S. O. Rice, "Noise in FM receivers," *Time Series Analysis*, M. Rosenblatt, Ed., Wiley, N.Y., 1963, pp. 395–422) and discussed in scores of works over the years. The Rice noise model assumes that the FM receiver accepts a signal in additive noise that consists essentially of a continuous Gaussian component occasionally interrupted by a click.

The performance of a narrow-band limiter-discriminator (LD) digital FM system was first described by Tjhung and Wittke (T. T. Tjhung et al., "Carrier transmission of binary data in a restricted band," *IEEE Trans. Commun. Technol.*, vol. COM-18, pp. 295–304, August 1977) using the Rice noise model. Their approach was later simplified by Cartier (D. E. Cartier, "Limiter-discriminator detection performance of Manchester and NRZ coded FSK," *IEEE Trans. Aerosp. Electron. Syst.*, vol. AES-13, pp. 92–70, January 1977) and subsequently a complete analytical solution for the bit error rate (BER) in a narrow-band digital FM receiver was described by Pawula (R. F. Pawula, "On the theory of error rates for narrow-band digital FM," *IEEE Trans. Commun.*, vol. COM-29, pp. 1634–1643, November 1981) for certain regions of time-bandwidth product and frequency-deviation ratio. All of these early studies assume an integrate-and-dump (I&D) bit detector and rely on the Rice FM-click noise model.

The FM-click and the continuous Gaussian elements of the system noise were found to contribute equally to the BER for a frequency deviation ratio of h=0.7, and the clicks were found to dominate BER when h>0.7 and were found to be insignificant when h<0.7. Thus, the clicks were found to introduce a significant performance penalty in the optimum uncoded FM receiver using the integrate and dump (I&D) detector, for which the frequency deviation ratio, h=0.7 and the time-bandwidth product, BT=1.0.

In a later paper (R. F. Pawula, "Refinements to the theory of error rates for narrow-band digital FM," *IEEE Trans. Commun.*, vol. 36, pp. 509–513, April 1988), Pawula describes the theoretical performance of an uncoded narrow-band digital FM receiver using an I&D detector that operates over a fraction of the bit-interval. As the bit-interval fraction is reduced to zero, the I&D detector becomes in the limit a sample and hold (S&H) detector. Pawula found that a S&H detector exacted a performance penalty of 0.5 dB when substituted for an I&D detector. Later experimental efforts have shown excellent agreement with Pawula's theoretical results for both the I&D and the S&H detector. Except as a limiting instance of a fractional-interval I&D detector, the S&H detector has been of little interest and has had little application in the art because of the 0.5 dB performance penalty.

A discussion of the Rice noise model by Bar-David and Shamai (I. Bar-David et al., "On the Rice model of noise in FM receivers," *IEEE Trans. Inform. Theory*, vol. IT-34, pp. 1406–1419, November 1988) observes that practitioners in the art had long known that FM-clicks are the major limitation to improved BERs in LD threshold detectors, even at high signal-to-noise ratios (SNRs). Because the click is the culprit, the stochastic properties of FM-clicks had been widely investigated. The individual clicks had been shown to have a Poisson distribution at high SNRs, as would be expected. Individual clicks had been shown to be statistically independent of the Gaussian component at high SNRs.

As exemplified by the Bar-David and Shamai paper, the literature is replete with reported efforts to extend the BER performance of the uncoded digital FM receiver; including, for example, baseband pulse shaping, click estimation and cancellation, envelope compensation and sequence estimation. For many years, numerous practitioners have sought useful methods for detecting and eliminating the FM-click noise to improve the FM receiver noise threshold. Despite these many efforts to attain this well-known and long-sought objective in the FM receiver art, the problem of optimum click detection is still open.

Even more than uncoded digital FM reception, encoded digital FM reception also suffers from the limiting effects of FM-clicks. For instance, a seminal paper by Simon (Marvin K. Simon, "The impact of mismatch on the performance of coded narrow-band FM with limiter-discriminator detection," *IEEE Trans. Commun.*, vol. COM-21, pp. 28–36, January 1983) explores the theoretical performance of convolutionally-encoded narrow-band FM with LD detection and Viterbi decoding, using the theoretical methods introduced by Pawula. Simon finds that FM-clicks are the direct cause of the failure of decoding techniques based on soft decisions that assume Gaussian statistics at the LD output. Specifically, Simon used a Chernoff bounding technique to decouple the coding and the modulation and obtained some surprising theoretical results. For instance, he found that the FM-clicks create a "mismatch" between the coding channel and the decoding metric peculiar to the digital FM modulation. So the Viterbi decoding scheme does not provide "maximal likelihood" (ML) decoding for this modulation format in the presence of clicks. Accordingly, the expected performance improvement of soft decision decoding over hard decision decoding is inverted so that the hard decision decoding is better. In fact, the soft decision decoding performance is so degraded by the click effects that it cannot match even the uncoded system performance. Using an analog-to-digital converter (ADC) saturation level, the best theoretical soft decision decoding performance found was only 0.3 db better than the hard decision decoding performance. These results provide a clear example of the heavy performance penalty exacted by click noise in encoded digital FM receivers.

With this in mind, Simon proceeded to describe a theoretical FM receiver for which all FM-clicks are summarily removed by a "genie-aided" click detector, for which he suggests no useful embodiment. Simon shows that a "genie-aided" click detector can improve hard decision decoder performance by 1.3 dB and soft decision decoder performance by 3.3 db over a digital FM receiver for which no genie is available. Although Simon clearly shows the value of a "pre-detector" for FM clicks, he neither teaches nor suggests any useful means for implementing such a mechanism for removing the FM-click noise component before decoding the digital FM signal at the receiver.

It is desirable to resolve this problem by providing a LD threshold detector that can eliminate the effects of FM-clicks on decoder BER performance. Until now, this has not been possible because of the well-known limitations discussed above. These unresolved problems and deficiencies are clearly felt in the art and are solved by this invention in the manner described below.

SUMMARY OF THE INVENTION

This invention arises from the unexpectedly advantageous observation that, when the same limiter-discriminator (LD) output signal is presented to a sample-and-hold (S&H) detector and to an integrate and dump (I&D) detector, an error in one does not necessarily imply an error in the other because the S&H and I&D detector outputs are offset in time by one-half bit and they are not quite correlated. To the extent that the two detector outputs are uncorrelated, comparing the two detector output signals provides information sufficient to identify bit error locations, thereby allowing bit error correction in a subsequent decoder. With convolutional coding and Viterbi decoding, threshold-compensation and averaging of the two S&H and I&D detector output signals improves the receiver bit error rate (BER) performance by more than 3 dB over the soft-decision thresholded I&D detector alone, which, until now, was believed to be optimum in the art. Adding diversity to the coding and using envelope-compensation instead of threshold-compensation in the S&H detector improves BER performance even more.

It is a purpose of this invention to provide a new digital frequency-modulation (FM) LD receiver that can improve BER performance over that of the "optimal" FM LD receiver having an I&D detector.

It is an advantage of this invention that a receiver using a combination of the "optimal" I&D detector with the less-effective S&H detector improves BER performance by more than 3 dB over that of a receiver using an I&D detector alone.

In one aspect, the invention is a machine-implemented method for detecting the bit value corresponding to a data bit-interval of a digital FM receiver LD output signal including the steps of integrating the LD output signal over the data bit-interval to produce a first signal representing a first estimate of the corresponding bit value, producing a first bit detection signal representing a first threshold function of the first signal, sampling the LD output signal in the data bit-interval to produce a second signal representing a second estimate of the corresponding bit value, producing a second bit detection signal representing a second threshold function of the second signal, and combining the first and second bit detection signals to produce a final bit detection signal representing a final estimate of the corresponding bit value.

In another aspect, the invention is a digital FM receiver circuit having input means for receiving a digital FM signal representing a plurality of data bit-intervals each having a bit value, LD means coupled to the input means for demodulating the digital FM signal to produce a LD output signal having a value over a data bit-interval, I&D detector means coupled to the LD means for integrating the LD output signal over the data bit-interval to produce a first signal representing a first estimate of the corresponding bit value, first threshold means coupled to the I&D detector means for producing a first bit detection signal representing a first threshold function of the first signal, S&H detector means coupled to the LD means for sampling the LD output signal in the data bit-interval to produce a second signal representing a second estimate of the corresponding bit value, second threshold means coupled to the S&H detector means for producing a second bit detection signal representing a second threshold function of the second signal, and combining means coupled to the first and second threshold means for combining the first and second bit detection signals to produce a final bit detection signal representing a final estimate of the corresponding bit value.

It is another purpose of this invention to provide a new digital FM LD receiver that can identify and eliminate FM-clicks as they occur so that the associated bit errors can be corrected during the decoding process.

In yet another aspect, the method of the invention includes the steps of integrating the LD output signal over the data bit-interval to produce a first signal representing a first estimate of the corresponding bit value, producing a first bit detection signal representing to a first threshold function of the first signal, squaring the LD input signal envelope to produce a squared envelope signal, multiplying the squared envelope signal by the LD output signal to produce a product signal, sampling the product signal in the data bit-interval to produce a second bit detection signal representing a second estimate of the corresponding bit value, and combining the first and second bit detection signals to produce a final bit detection signal representing a final estimate of the corresponding bit value.

Another aspect of the invention is a digital FM receiver circuit having input means for receiving a digital FM signal representing a plurality of data bit-intervals each having a bit value, LD means coupled to the input means for demodulating the digital FM signal to produce a LD output signal having a value over a data bit-interval, I&D detector means coupled to the LD means for integrating the LD output signal over the data bit-interval to produce a first signal representing a first estimate of the corresponding bit value, first threshold means coupled to the I&D detector means for producing a first bit detection signal representing a first threshold function of the first signal, envelope squaring means coupled to the input means for squaring the digital FM signal envelope to produce a squared envelope signal, multiplier means coupled to the envelope squaring means and to the LD means for multiplying the squared envelope signal by the LD output signal to produce a product signal, S&H detector means coupled to the multiplier means for sampling the product signal in the data bit-interval to produce a second bit detection signal representing a second estimate of the corresponding bit value, and combining means coupled to the first and second threshold means for combining the first and second bit detection signals to produce a final bit detection signal representing a final estimate of the corresponding bit value.

It is an advantage of the receiver of this invention that, in the presence of FM-clicks, it provides receiver BER performance within 0.5 dB of the optimal theoretical performance for encoded signals without FM-click noise.

The foregoing, together with other features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments illustrated in the accompanying drawing, wherein:

FIG. 1 shows a functional block diagram illustrating an optimal digital FM limiter-discriminator (LD) receiver embodiment from the prior art;

FIG. 2 shows a functional block diagram illustrating an alternative digital FM LD receiver embodiment from the prior art;

FIG. 4 shows a functional block diagram illustrating the digital FM LD receiver of this invention;

FIG. 5 shows a functional block diagram of a encoding and interleaving digital FM transmitter from the prior art;

FIG. 6 shows a functional block diagram illustrating a preferred embodiment of the digital FM LD receiver of this invention;

FIG. 7 shows a functional block diagram illustrating a preferred embodiment of the digital FM LD receiver of this invention.

DESCRIPTION OF THE PREFERRED EMBODIMENTS

Figure 3:
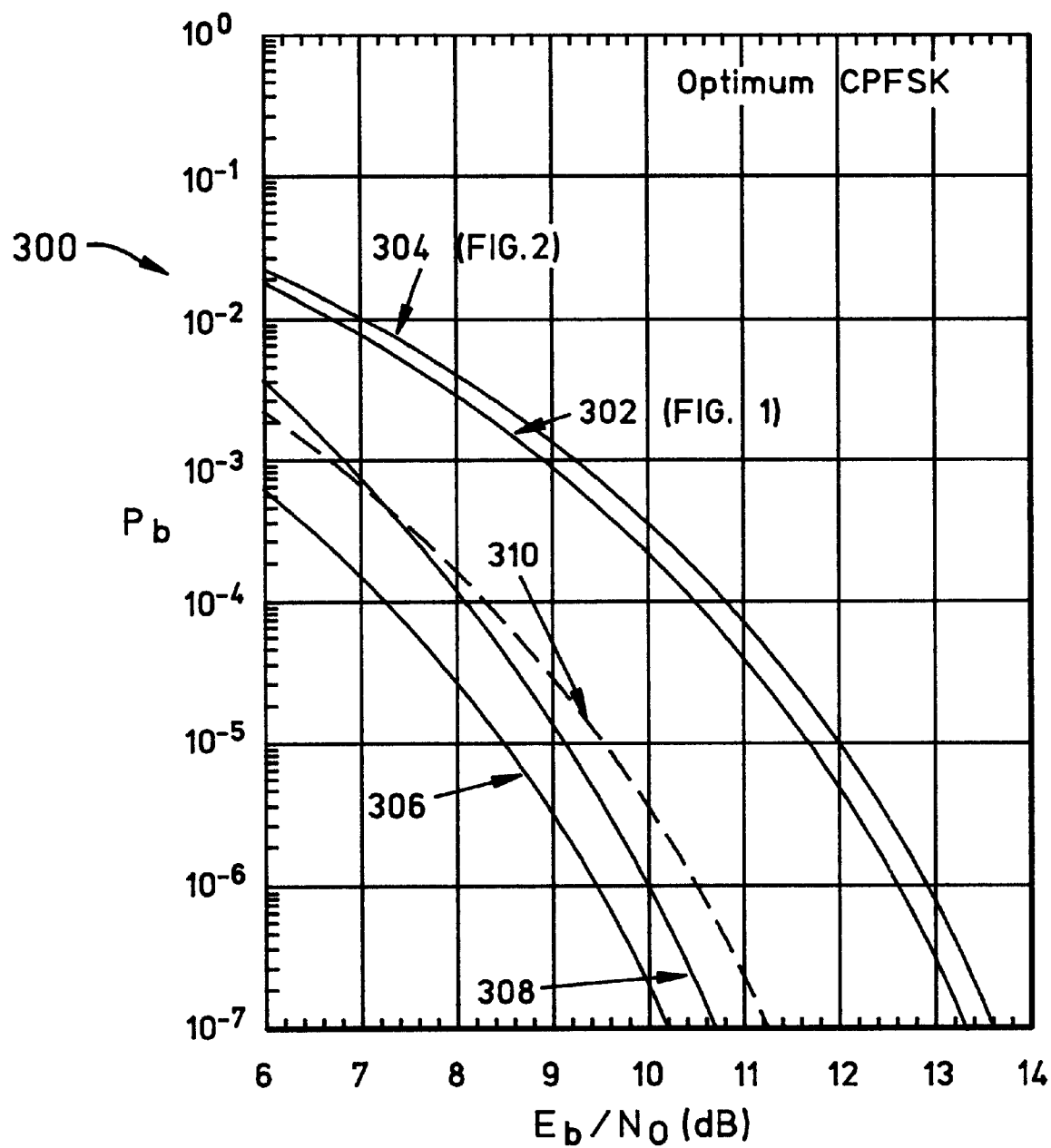
FIG. 3 shows a chart illustrating the bit error rate (BER) characteristics of the receivers of FIGS. 1 and 2 compared with theoretically optimum BER characteristics for continuous-phase frequency-shift-keying (CPFSK) and minimum-shift-keying (MSK) modulation.

A Description of the Limiter-Discriminator (LD) Receiver

FIG. 1 shows a functional block diagram of the optimal limiter-discriminator (LD) receiver 100 known in the art for narrow-band digital FM reception. LD receiver 100 includes an input 102 for receiving a digital FM signal representing a sequence d(t) of data bit-intervals each having a bit value represented in a manner well-known in the art. The intermediate-frequency (IF) filter 104 removes most of the outband noise from input signal 102 boost signal-to-noise ratio in an IF filter output signal 106. The limiter 108 clips IF filter output signal 106 in the well-known manner to produce a limiter output signal 110. The signals 102, 106 and 110 can be described as follows:

$$X_{102}(t) = \sqrt{2S}\cos[\omega_0 t + \theta(t)] + n(t) \quad \text{[Eqn. 1]}$$

$$x_{106}(t) = \sqrt{2S}\, a(t)\cos[\omega_0 t + \phi(t)] + n_{IF}(t) \quad \text{[Eqns. 2]}$$
$$= \sigma R(t)\cos[\omega_0 t + \eta(t)]$$

$$X_{110}(t) = \cos[\omega_0 t + \eta(t)] \quad \text{[Eqn. 3]}$$

wherein:

t=time;

f=frequency;

S=the signal power;

$\omega_0 = 2\pi f_0$ = the IF center radian frequency;

n(t)=white Gaussian noise with one-sided spectral density $N_0$, $n_{IF}(t)$=the IF filtered noise with noise power $$\sigma^2 = N_0 \int_{-\infty}^{\infty} |H(f)|^2 df$$

$a^2(t)$ = the normalized instantaneous signal energy [Eqn. 4]

$$= \left(\int_{-\infty}^{t} h(t-\tau)\cos\theta(\tau)d\tau\right)^2 + \left(\int_{-\infty}^{t} h(t-\tau)\sin\theta(\tau)d\tau\right)^2$$

R(t) = the envelope of $x_{106}(t)$ normalized by $\sigma$ [Eqn. 5]

$$= \sqrt{I^2(t) + Q^2(t)}$$

with in-phase and quadrature components given by:

$I(t) = \sqrt{2\rho(t)}\cos\phi(t) + \xi(t)$ $Q(t) = \sqrt{2\rho(t)}\sin\phi(t) + \zeta(t)$ [Eqns. 6]

and the three phase angles in Eqns. 1–3 are:

$$\theta(t) = 2\pi f_d \int_{-\infty}^{t} d(\tau)d\tau; \quad \text{[Eqn. 7]}$$

$$\phi(t) = \text{Arctan} \int_{-\infty}^{t} \frac{h(t-\tau)\sin\theta(\tau)dt}{\int_{-\infty}^{t} h(t-\tau)\cos\theta(\tau)d\tau}; \text{ and} \quad \text{[Eqn. 8]}$$

$$\eta(t) = \text{Arctan}\frac{Q(t)}{I(t)}. \quad \text{[Eqn. 9]}$$

The instantaneous signal-to-noise ratio (SNR) is defined as:

$$\rho(t) = \frac{E_b}{N_0}\frac{a^2(t)}{T\int_{-\infty}^{\infty}|H(f)|^2 df} \quad \text{[Eqn. 10]}$$

where T is the bit-interval period and $E_b$=ST is the signal energy.

In Eqns. 6, $\xi(t)$ and $\zeta(t)$ are zero-mean Gaussian processes with unit variances and correlations expressed as:

$$r(t) = E[\xi(t)\xi(t+\tau)] = E[\zeta(t)\zeta(t+\tau)] = \frac{F^{-1}\{|H(f)|^2\}}{\int_{-\infty}^{\infty}|H(f)|^2 df} \quad \text{[Eqn. 11]}$$

$E[\xi(t)\zeta(t+\tau)] = 0$ [Eqn. 12]

Limiter output signal 110 is received by a discriminator 112, which produces the LD output signal 114, which is the time-derivative of η(t) from Eqn. 9. LD output signal 114 is received by the integrate-and-dump (I&D) detector 116, which reintegrates this derivative over the current bit-interval. After the bit-interval is adjusted for the group delay of IF filter 104, for I&D detector 116, the resulting phase difference in the I&D output signal 118 can be shown to be:

$\Delta\Phi = [\eta(t) - \eta(0)]\text{mod}2\pi - 2\pi N(0, T)$ [Eqn. 13]

$= \psi - 2\pi N(0, T)$ in which N(0,T) denotes the number of FM-clicks (either positive or negative with respect to that of the transmitted bit) during the current bit-interval.

I&D output signal 118 is then processed by a decoder 120, which may use any useful method known in the art for recovering the encoded bit sequence d(t) and producing it at the decoder output 122. For instance, the bit value within the bit-interval can be determined by making a decision depending on the value of the phase difference expressed in Eqn. 13 and passing this decision along in decoder output signal 122. Such decisions may also be adjusted depending the decisions made for one or more earlier and/or later bit-intervals.

FIG. 2 shows a functional block diagram of an alternative limiter-discriminator (LD) receiver 200 known in the art for narrow-band digital FM reception. The numerals in FIGS. 1 and 2 are keyed to similar features for ease of comparing the two different receivers 100 and 200. LD receiver 200 includes an input 202 for receiving a digital FM signal representing the sequence d(t) of data bit-intervals discussed above. The intermediate-frequency (IF) filter 204 removes most of the outband noise from input signal 202 boost signal-to-noise ratio in an IF filter output signal 206. The limiter 208 amplifies and clips IF filter output signal 206 in the well-known manner to square it up to produce a limiter output signal 210. The signals 202, 206 and 210 are respectively identical to the signals 102, 106 and 110 described above in Eqns. 1–3. Limiter output signal 210 is received by a discriminator 212, which produces the LD output signal 214, which is substantially the same as LD output signal 114 described above.

However, in FIG. 2, LD output signal 214 is received by the sample-and-hold (S&H) detector 216, which merely samples the instantaneous frequency at the center of the bit-interval. S&H detector 216 may be viewed as an I&D detector wherein the integration interval is limited to an insignificant fraction of the entire bit-interval. Thus, instead of detecting phase information at the ends of the bit-interval like I&D detector 116, S&H detector 216 detects frequency information at the middle of the bit-interval, after the bit-interval is adjusted for the group delay of IF filter 204. The resulting frequency information embodied in the S&H output signal 218 is expressed as $$\omega = \frac{d\eta(T/2)}{dt}$$ [Eqns. 14]

$$= \frac{I(T/2)Q'(T/2) - Q(T/2)I'(T/2)}{R^2(T/2)}$$

$$= \frac{2\rho\phi' + \sqrt{2\rho}\,[(\phi'\xi + \zeta' - \rho'\zeta/2\rho)\cos\phi + (\phi'\zeta - \xi' + \rho'\xi/2\rho)\sin\phi] + \xi\zeta' - \xi'\zeta}{2\rho + 2\sqrt{2\rho}\,(\xi\cos\phi + \zeta\sin\phi) + \xi^2 + \zeta^2}$$

in which all right-hand-side (RHS) quantities are evaluated at the center of the bit-interval and the primes denote differentiation with respect to time. When the envelope R(T/2) is small, the instantaneous frequency from Eqns. 14 can be quite large because of the small denominator. This situation corresponds to the occurrence of a click at the center of the bit-interval.

S&H output signal 218 is then processed by a decoder 220, which may use any useful method known in the art for recovering the encoded bit sequence d(t) and producing it at the decoder output 222. For instance, the bit value within the bit-interval can be determined by making a decision depending on the value of the instantaneous frequency expressed in Eqn. 14 and passing this decision along in decoder output signal 222. Such decisions may also be adjusted depending the decisions made for one or more earlier and/or later bit-intervals.

FIG. 3 shows a chart 300 illustrating the BER (vertical axis) as a function of signal-energy-to-noise ratio (horizontal axis) for the digital FM receivers 100 and 200 discussed above for continuous-phase frequency-shift-keying (CPFSK) modulation with hard thresholding and no encoding, using a third-order Butterworth embodiment of filters 104 and 204. The curve 302 shows the performance for FM receiver 100 discussed above and the curve 304 shows the performance for FM receiver 200 discussed above. The I&D detector performance of curve 302 is better than the S&H detector performance of curve 304; by about 0.3 dB. The curves 306 and 308 show the theoretically optimum L&D receiver performance for coherent and non-coherent CPFSK modulation (h=0.715), respectively, from work published by Osborne and Luntz (W. P. Osborne et al., "Coherent and non-coherent detection of CPFSK," *IEEE Trans. Commun.*, vol. COM-22, pp. 1023–1036, August 1974). Note that the BER performance in curve 306 for coherent CPFSK modulation is at least 0.5 dB better than the BER performance in curve 308 for non-coherent CPFSK modulation. The curve 310 shows the performance of coherent detection for minimum-shift-keying (MSK) modulation (h=0.5) and the performance of a coherent phase-shift-keying (PSK) receiver. In the 1974 article, Osborne and Luntz showed that they could provide coherent and non-coherent detection of CPFSK by averaging over three to five data bits to achieve CPFSK performances (curves 306 and 308) superior to the performance (curve 310) of conventional coherent PSK and coherent MSK receivers. In view of FIG. 3, there can be appreciated a significant performance gap of perhaps 3 dB or more between the theoretical optimum BER performance of curves 306, 308 and 310 and the best-achievable actual performance of the I&D threshold detector shown in curve 302. During the years since the 1974 work published by Osborne and Luntz, the literature has seen over a hundred reports of efforts to improve the performance of FM receiver 100 to "fill the gap" between curves 302–304 and 306–308. None have reported more than perhaps 1 dB of improvement. None of these studies suggest the use of anything other than the I&D detector 116 (FIG. 1) alone; perhaps because the performance (curve 304) of S&H detector 216 (FIG. 2) falls short of the performance (curve 302) of I&D detector 116 (FIG. 1).

Using the LD Receiver With Convolutional Encoding

The Chernoff bounding technique was described in great detail by Simon in the reference recited hereinabove. For soft decisions, the Chernoff bound on pairwise error probability is found by minimizing an expectation function D(λ) with respect to λ so that $$D = \min_\lambda D(\lambda)$$

in which:

$$D(\lambda) = E_s\{E[e^{-\lambda(\psi + \Delta\phi - 2\pi\Lambda)}|s]\} \text{ for I\&D}$$ [Eqn. 15]

$$D(\lambda) = E_s\{E[e^{-\lambda v}|s]\} \text{ for S\&H}$$ [Eqn. 16]

where $$v = \frac{\omega}{\sqrt{-r''(0+)}} = \frac{\omega}{2\pi\sigma_H}$$

is a normalized frequency and $$\sigma_H^2 = \frac{\int_{-\infty}^{\infty} f^2 |H(f)|^2 \, df}{\int_{-\infty}^{\infty} |H(f)|^2 \, df}$$

is the variance of the IF filter amplitude-squared transfer function, H(f). Here, the vector s denotes all 3-bit data sequences corresponding to a correct decision. Thus, if a "1" were transmitted, then all data sequences must have a "1" in the center bit position. The outer expectations are thus statistical averages over the noises.

Once D is determined, a bound to the bit error probability can be found in the form $P_b \leq G(D)$ in which the function G(D) depends only on the specific convolutional code used. For the constraint length K=7, rate $r_c$=½ optimum binary convolutional code, this function is known to be $$G(D) = (\tfrac{1}{2})(36D^{10} 30\ 211D^{12} + 1404D^{14} + 11633D^{16} + \dots) \quad [\text{Eqn. 17}]$$

To appreciate this, consider that the coding channel for hard decision decoding becomes a binary symmetric channel for which the Chernoff bound parameter $D=\sqrt{4P_c(1-P_c)}$, in which $P_c$ is the uncoded channel error probability with the bit signal-energy-to-noise spectral density $E_b/N_0$ replaced by chip signal-energy-to-noise spectral density $E_c/N_0$.

Computing the expectations over the noises require some means for computing the probability density functions of the noisy phase $p(\psi)$ and the noisy radian frequency $p(v)$ but these are generally so complicated that numerical techniques (e.g., Monte Carlo simulations) are more practical.

I&D output signal 118 can be "thresholded" by imposing a threshold function $f_1(z)$ to obtain either a "soft" saturation or "hard" limiting decision for the bit value sought for the current bit-interval. If this is done, then Eqn. 15 can be rewritten as $$D(\lambda) = E_s\{E[e^{-\lambda f_1(\psi + \Delta\phi - 2\pi N)}|s]\} \text{ for I\&D} \quad [\text{Eqn. 18}]$$

The function $f_1(z)$ could represent either the soft saturation or the hard limiting suggested by Simon in the reference recited hereinabove. For soft saturation, where L is a preselected constant, the threshold function suggested by Simon is $$f_{softL}(z) = \begin{cases} z; & |z| \leq L \\ L\,\text{sgn}(z); & |z| > L \end{cases} \quad [\text{Eqn. 19}]$$

and, for hard limiting, the threshold function suggested by Simon is $$f_{hard}(z) = \text{sgn}(z) \quad [\text{Eqn. 20}]$$

Simon found that his soft-limiting function of Eqn. 19 gives a mere 0.3 dB improvement over the hard-limiting function of Eqn. 20. For the threshold-compensated detection used in the digital FM receiver of this invention, the hard and soft threshold functions are instead chosen to be $$f_{soft0}(z) = \begin{cases} z; & |z| \leq L \\ 0; & |z| > L \end{cases} \quad [\text{Eqn. 21}]$$

$$f_{hard0}(z) = \begin{cases} \text{sgn}(z); & |z| \leq L \\ 0; & |z| > L \end{cases} \quad [\text{Eqn. 22}]$$

The nonlinear functions in Eqns. 19–20 suggested by Simon do serve to "clips the clicks" but the thresholded clicks retain enough energy to disrupt downstream decoding. In accordance with the teachings of this invention, the downstream effects of the FM-clicks are better mitigated by the threshold-compensation functions of Eqns. 21–22, which provide a "null" or "zero" output when the circumstances indicate, according to the selected function, that the click appears to overwhelm the signal in the bit-interval. This can be appreciated by considering that such "zero" inputs to a Viterbi decoder represent "erasures" instead of wrong bit-value guesses. The Viterbi decoder does not correct errors effectively with the large metrics generated by FM-click errors and a "zero or null-vote upon error" does less damage to the decoding process than does a wrong choice between±1.

The LD Receiver of This Invention

FIG. 4 shows a functional block diagram of a preferred embodiment of the limiter-discriminator (LD) receiver 400 of this invention for narrow-band digital FM reception. LD receiver 400 includes an input 402 for receiving a digital FM signal representing a sequence d(t) of data bit-intervals each having a bit value represented in a manner well-known in the art. The intermediate-frequency (IF) filter 404 removes most of the outband noise from input signal 402 boost signal-to-noise ratio in an IF filter output signal 406. The limiter 408 clips IF filter output signal 406 in the well-known manner to produce a limiter output signal 410. The signals 402, 406 and 410 are respectively identical to the signals 102, 106 and 110 described above in Eqns. 1–3. Limiter output signal 410 is received by a discriminator 412, which produces the LD output signal 414, which is substantially the same as LD output signals 114 and 214 described above as the time-derivative of η(t) from Eqn. 9.

In receiver 400, LD output signal 414 is received by an I&D detector 424 and by a S&H detector 426. I&D detector 424 reintegrates LD output signal 414 over the bit-interval to produce an I&D output signal 428, which has the same features as I&D output signal 118 described above in connection with FIG. 1 and Eqn. 13. S&H detector 426 detects frequency information at the middle of the bit-interval in LD output signal 414 and produces an S&H output signal 430, which has the same features as S&H output signal 218 described above in connection with FIG. 2 and Eqn. 14. Finally, I&D output signal 428 is combined with S&H output signal 430 in a comparator 416 to produce a detector output signal 418 representing a final bit value detected for the bit-interval. Detector output signal 418 is then processed by a decoder 420, which may use any useful method known in the art for recovering the encoded bit sequence d(t) and producing it at the decoder output 422.

I&D output signal 428 and S&H output signal 430 are not entirely correlated; so an error in one does not necessarily imply an error in the other. This can be appreciated by considering that I&D detector 424 makes a bit-value decision using phase information at the ends of the bit-interval, whereas S&H detector 426 makes a bit-value decision using instantaneous frequency information from the middle of the bit-interval. When these decisions are uncorrelated, comparing the two output signals 428 & 430 permits isolation of the bit errors by identifying the exact error bit locations in the recovered sequence d(t) of data bits. Once trapped, the errors can be corrected in decoder 420 by means of, for example, a simple trellis code.

The usefulness of the dual detector scheme of this invention can be appreciated with reference to the following heuristic (qualitative) discussion. The I&D and S&H detector outputs (before thresholding) can be expressed as $$\text{output}_{I\&D} = \text{signal}_{I\&D} + \text{noise}_{I\&D} + \text{clicks}$$

$$\text{output}_{S\&H} = \text{signal}_{S\&H} + \text{noise}_{S\&H}$$

in which the noise terms are the continuous parts of the noises distinct from the FM-clicks. The signals are not the same and each depends in complex and varying ways on the sequential bit patterns. Nonetheless, each signal is positive for a bit value of "1" and negative for a bit value of "0." The signals must be normalized to allow direct comparison because one has units of phase and the other has units of radial frequency. After the output signals are normalized by means of a constant multiplier, which is also selected to make the output signal amplitudes more comparable, and assuming that the signals are essentially uncorrelated, the two outputs may be averaged to produce $$\frac{\text{output}_{I\&D} + \text{output}_{S\&H}}{2} \approx \text{signal} + \frac{\text{noise}}{\sqrt{2}} + \frac{\text{clicks}}{2} \quad \text{[Eqn. 23]}$$

in which the "signal" and "noise" are either of the respective I&D or S&H components. From Eqn. 23, it may be appreciated that the continuous noise power is reduced by about 3 dB (because of the presumed lack of correlation) and that the clicks are reduced in amplitude by half (the S&H output has no clicks). In actuality, the continuous noise components are somewhat correlated and may not drop by the full 3 dB. Similarly, the click amplitudes may not fall by the full half because of inequality of output signal amplitudes. Nevertheless, this heuristic discussion shows why there is further BER performance improvement available from the dual-detector averaging technique of this invention that was unsuspected until now. According to the method of this invention, additional BER performance improvement can be realized by adding a threshold function to the I&D and/or S&H detectors as well.

FIG. 5 shows a functional block diagram of a digital FM transmitter 500 from the prior art that employs convolutional encoding and interleaving to improve channel performance in noise. A binary data source 502 produces a sequence $d_1(t)$ of data bit-intervals each having a bit value and presents it as a first digital signal 504. A convolutional encoder 506 receives first digital signal 504 and produces a second digital signal 508 that represents another sequence $d_2(t)$ of data bit-intervals related in a well-known manner to sequence $d_1(t)$ of first digital signal 504. An interleaver 510 accepts second digital signal 508 and produces a third digital signal 512 representing another sequence $d_3(t)$ of data bit-intervals related in a well-known manner to sequence $d_2(t)$ of second digital signal 508. The usefulness and purpose of encoder 506 and interleaver 510 are well-known in the art and need no further description herein. An FM modulator 514 accepts a single radio-frequency (RF) carrier signal 516 and adjusts phase and frequency responsive to third digital signal 512, thereby producing a frequency-modulated (FM) radio signal 518 representing the third sequence $d_3(t)$ of data bit-intervals, which is broadcast for wireless reception in a well-known manner.

FIG. 6 shows a functional block diagram illustrating a preferred embodiment 600 of the digital FM LD receiver of this invention, which is useful for receiving FM radio signal 518 and recovering the data bit values in the initial sequence $d_1(t)$ of data bit-intervals produced by binary data source 502. An input signal 602 derived from the incoming FM radio signal 518 (not shown in FIG. 6) is received by an intermediate-frequency (IF) filter 604, which produces an IF filter output signal 606. The limiter-discriminator (LD) 608 accepts filter output signal 606 and produces a LD output signal 614, which is presented to an I&D detector 624 and an S&H detector 626. LD output signal 614 is discussed hereinabove in connection with Eqn. 9 and can be expressed as:

$$\frac{d\eta(t)}{dt} = \frac{d}{dt}\text{Arctan}\frac{Q(t)}{I(t)} \quad \text{[Eqn. 24]}$$

I&D detector 624 produces an I&D output signal 628, which is the phase difference information described by Eqn. 13 above and S&H detector 626 produces an S&H output signal 630, which is the instantaneous frequency information described by Eqn. 14 above. I&D output signal 628 is processed by the threshold function $f_1(z)$ 632 to produce a first threshold signal 634 representing a first estimate of the bit value within a bit-interval. S&H output signal 630 is processed by the threshold function $f_2(z)$ 636 to produce a second threshold signal 638 representing a second estimate of the bit value within the same bit-interval. First and second threshold functions 632 and 636 may be hard or soft threshold functions, such as discussed above with reference to Eqns. 21–22, which are preferred for the receiver of this invention.

First and second threshold signals 634 and 638 are combined in the summer 640 to produce a third detection signal 642 representing a final estimate of the bit value within the bit-interval. A deinterleaver 644 accepts third detection signal 642 and, with a Viterbi decoder 646, produces a FM receiver output signal 648 representing the estimate of the bit sequence $d_1(t)$ first created by binary data source 502 (FIG. 5). Interleaver 644 and Viterbi decoder 646 operate in a well-known manner to reverse the bit encoding effects of interleaver 510 and convolutional encoder 506 mentioned above with reference to FIG. 5. Ultimately, the sign (bit-value) of the transmitted bit is estimated by making a decision respecting the algebraic sign of the algebraic sum of the thresholded phase difference of Eqn. 13 and the thresholded instantaneous frequency of Eqn. 14. According to this invention, one or both of these two addends (threshold signals 634 and 638) may be presented to summer 640 as a "neither" or "null" value according to the threshold-compensation functions exemplified by Eqns. 21–22, which operates to minimize the disruptive effect of the FM-click on the downstream deinterleaving and Viterbi decoding process.

FIG. 7 shows a functional block diagram illustrating an alternative preferred embodiment 700 of the digital FM LD receiver of this invention, which is useful for receiving FM radio signal 518 and recovering the data bit values in the initial sequence $d_1(t)$ of data bit-intervals produced by binary data source 502 (FIG. 5). An input signal 702 derived from the incoming FM radio signal 518 (not shown in FIG. 7) is received by an intermediate-frequency (IF) filter 704, which produces an IF filter output signal 706. The limiter-discriminator (LD) 708 accepts filter output signal 706 and produces a LD output signal 714, which is presented to an I&D detector 724 and a multiplier 750. LD output signal 714 is discussed hereinabove in connection with Eqn. 24. I&D detector 724 produces an I&D output signal 728, which is the phase difference information described by Eqn. 13 above. I&D output signal 728 is processed by the threshold function $f_1(z)$ 732 to produce a first signal 734 representing a first estimate of the bit value within a bit-interval. The threshold function 732 may be a hard or soft threshold function, such as discussed above with reference to Eqns. 21–22, which are "threshold-compensated" functions that are preferred for the receiver of this invention.

Filter output signal 706 is also accepted by an detector 752, which produces an signal 754. The squaring circuit 756 squares signal 754 to produce a squared signal 758, which is accepted by multiplier 750. Multiplier 750 produces a product signal 760 representing the product of squared signal 758 and LD output signal 714, thereby canceling the denominator in the second of Eqns. 14 discussed hereinabove and reducing the effects of FM-clicks on the instantaneous frequency represented by LD output signal 714. The S&H detector 726 samples this less-sensitive product signal 760 to produce a second signal 738 representing a second estimate of the bit value within the same bit-interval. This arrangement (shown in FIG. 7 as elements 750–760) is herein denominated "envelope-compensation," which eliminated FM-clicks so that no additional threshold-compensation is needed.

First and second signals 734 and 738 are combined in the summer 740 to produce a third signal 742 representing a final estimate of the bit value within the bit-interval, A deinterleaver 744 accepts third signal 742 and, with a Viterbi decoder 746, produces a FM receiver output signal 748 representing the estimate of the bit stream $d_1(t)$ first created by binary data source 502 (FIG. 5). Interleaver 744 and Viterbi decoder 746 operate in a well-known manner to reverse the bit encoding effects of interleaver 510 and convolutional encoder 506 mentioned above with reference to FIG. 5. Ultimately, the sign (value) of the transmitted bit is estimated by making a decision respecting the algebraic sign of the algebraic sum of the thresholded phase difference of Eqn. 13 and the thresholded instantaneous frequency of Eqn. 14. According to this invention, one or both of these two addends (threshold signals 734 and 738) may be presented to summer 740 as a "neither" or "null" value according to the threshold-compensation functions exemplified by eqns. 21–22, which operates to minimize the disruptive effect of the FM-click on the downstream deinterleaving and Viterbi decoding process.

BER Performance of the LD Receiver of this Invention

For digital FM receiver 600 of this invention employing the averaged outputs from a thresholded I&D detector and a thresholded S&H detector, with soft decisions, the Chernoff bound on pairwise error probability found by minimizing a function $D(\lambda)$ with respect to $\lambda$ so that $$D = \min_{\lambda} D(\lambda)$$

can be shown to be expressed as:

$$D(\lambda)=E_s\{E[e^{-\lambda f_1(\psi+\Delta\phi-2\pi N)-\lambda k f_2(v)}|s]\} \qquad [\text{Eqn. 25}]$$

in which the parameter k is a weighting factor to account for the relative amplitude of the S&H output signal relative to the I&D output signal. Assuming no correlation and considering the multi-modal character of the probability density function of the noise arising from the Poisson distribution of the FM-click incidents, Eqn. 25 can be rewritten and simplified to produce approximate expressions for the BER as a function of bit signal-energy-to-noise ratio. Complete absence of correlation must be assumed to simplify the problem so that it is tractable; the actual BER performance expected of the dual-detector receiver degrades from such ideal calculation to the degree that the two detector outputs are correlated. Alternatively, numerical simulations can be used to obtain more accurate estimates of BER performance curves for the non-ideal (partially-correlated) case.

For digital FM receiver 700 employing the averaged outputs from a I&D detector and a envelope-compensated S&H detector, with soft decisions, the Chernoff bound on pairwise error probability found by minimizing a function $D(\lambda)$ with respect to $\lambda$ can be shown to be expressed as:

$$D(\lambda)=E_s\{E[e^{-\lambda f_1(\psi+\Delta\phi-2\pi N)-\lambda k R^2(v)}|s]\} \qquad [\text{Eqn. 26}]$$

From Eqns. 14, it can be appreciated that $R^2 v$ is a quadratic form in Gaussian variates, so that Eqn. 25 can be used directly to produce closed-form expressions for the BER as a function of bit signal-to-noise ratio. Numerical simulations can also be used here to obtain estimates of BER performance curves for the envelope-compensated embodiment of this invention.

Figure 8:
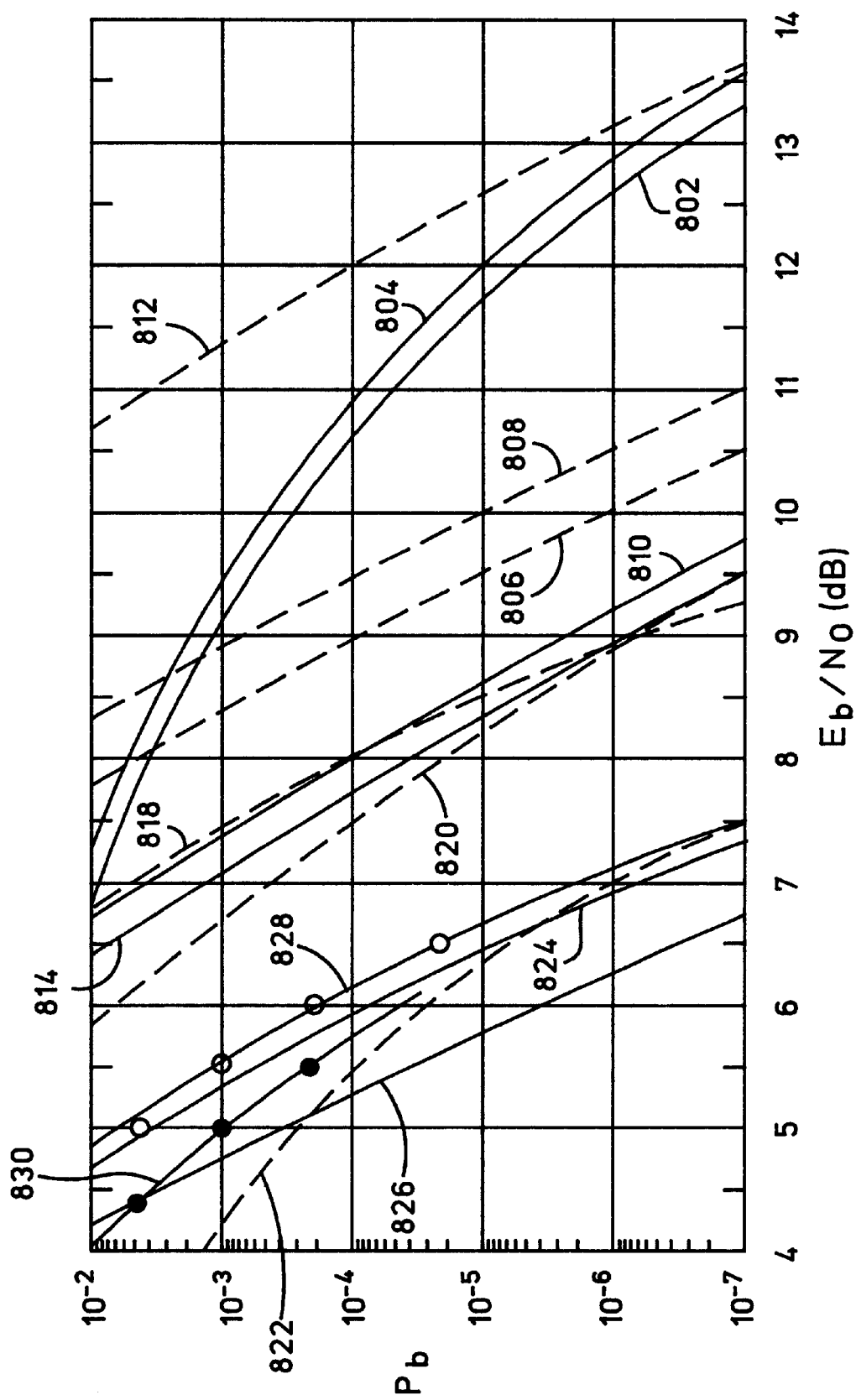
FIG. 8 shows a chart illustrating the bit error rate (BER) characteristics of several embodiments of the digital FM LD receiver of this invention compared with several theoretical and experimental BER characteristics for Viterbi decoding of a (rate ½, length 7) convolutional code.

The inventors prepared computer programs to compute the expectations in Eqns. 25–26 for various threshold functions and values, using a third-order Butterworth embodiment of IF filters 604 and 704, which provides better uncoded receiver performance than either a Gaussian or second-order Butterworth IF filter embodiment. FIG. 8 shows a chart 800 illustrating the BER (vertical axis) as a function of bit signal-energy-to-noise ratio (horizontal axis). Theoretical and numerically-simulated results are shown for various ideal and actual receiver embodiments discussed above. BER performance is compared for various combinations of the I&D and S&H detectors, for coded and uncoded signals, with and without hard and soft threshold decisions, with and without threshold- and envelope-compensation, and the like.

The curve 802 shows the BER performance of I&D receiver 100 (FIG. 1) using uncoded digital data. The curve 804 shows the BER performance of S&H receiver 200 (FIG. 2) using uncoded digital data. It can be readily appreciated that the I&D detector of I&D receiver 100 is about 0.5 dB better than the S&H detector of S&H receiver 200, as is well-known in the art.

The curve 806 shows the BER performance ofI&D receiver 100 (FIG. 1) using coded digital data with hard-decision thresholding without threshold-compensation (Eqn. 20). The curve 808 shows the BER performance of S&H receiver 200 (FIG. 2) using coded digital data with hard-decision thresholding without threshold-compensation (Eqn. 20). It can be readily appreciated that the I&D detector of I&D receiver 100 (curve 806) is about 0.5 dB better than the S&H detector of S&H receiver 200 (curve 808), and that hard-decision thresholding with coded data improves BER performance over that for uncoded data (curves 802 and 804) at the higher bit signal-energy-to-noise ratios even without the threshold compensation of this invention.

The curve 810 shows the BER performance of I&D receiver 100 (FIG. 1) using coded digital data with hard-decision thresholding with threshold-compensation (Eqn. 22). The curve 814 shows the BER performance of I&D receiver 100 (FIG. 1) using coded digital data with soft-decision thresholding with threshold-compensation (Eqn. 21). The curve 812 shows the BER performance of I&D receiver 100 (FIG. 1) using coded digital data with soft-decision thresholding without threshold-compensation (Eqn. 19). It can be quickly appreciated from curves 814 and 810 in FIG. 8 that, by adding threshold-compensation (in the manner shown in FIGS. 6 and 7) to the I&D receiver 100 (FIG. 1), the BER performance can be improved significantly over I&D receiver 100 using coded digital data with hard-decision thresholding without threshold-compensation (curve 806) and especially improved over I&D receiver 100 using coded digital data with soft-decision thresholding without threshold-compensation (curve 812). The curve 818 shows the BER performance of a receiver having a S&H detector with envelope-compensation (shown in FIG. 7 as elements 750–760) using coded digital data with soft-decision thresholding. FIG. 8 also demonstrate that adding envelope-compensation (shown in FIG. 7 as elements 750–760) to S&H receiver 200 (FIG. 2) improves the performance (curve 818) over the performance of the S&H receiver 200 using coded digital data with hard-decision thresholding without envelope-compensation (curve 808). The three (curves 810, 814 and 818) are all superior to the hard-decision thresholded I&D receiver 100 (curve 806) and the hard-decision thresholded S&H receiver 200 (FIG. 2) (curve 808) without the threshold-compensation of this invention.

The curve 820 shows the idealized BER performance of a hard-decision thresholded I&D receiver 100 (FIG. 1) (Eqn. 20) using coded digital data and a "genie-assisted" means for removing FM-clicks per Simon in the hereinabove recited reference. The curve 822 shows the idealized BER performance of a soft-decision thresholded I&D receiver 100 (FIG. 1) (Eqn. 19) using coded digital data and a "genie-assisted" means for removing FM-clicks per Simon. Since 1974, these hard- and soft-decision threshold performance curves 820 and 822, respectively, have represented the idealized upper bound on BER performance known in the art for I&D receiver 100 (FIG. 1). The curve 824 shows the idealized BER performance of the soft-decision thresholded receiver 600 of this invention (FIG. 6) using coded digital data with the two threshold-compensation networks 632 and 638 (Eqn. 21 with L=pi). The curve 826 shows the idealized BER performance of receiver 700 of this invention (FIG. 7) using coded digital data with soft-decision threshold-compensation (Eqn. 21 with L=pi) for the I&D detector and envelope-compensation (shown in FIG. 7 as elements 750–760) for the S&H detector. The curve 828 connects the open circles that show the results of numerical simulations (Monte Carlo) of the BER performance of receiver 700 of this invention (FIG. 7) for the same conditions that produced curve 826. The curve 830 connects the dark circles that show the results of Monte Carlo simulations for the same conditions used to create curve 826 except that the coded digital data includes diversity of two; that is, each bit is transmitted twice, thereby sacrificing channel data rate to add redundancy to the encoded bit stream. The noise correlations were exactly accounted for in the Monte Carlo simulations (curves 828 and 830) of receiver 700 (FIG. 7), which show more than a 3 dB improvement over the hard-decision thresholded receiver curves 806 and 808.

The circa 0.75 dB difference between the two curve 826 and 828 (idealized and simulated, respectively) provides a measure of the predictive error arising from the assumption in curve 826 that detector outputs 628 and 630 (FIG. 6) are uncorrelated. Curve 826 shows more than a 3 dB improvement gain over either receiver 100 or 200 with hard-decision thresholding alone (curves 806 and 808), Comparing curves 828 and 830 demonstrates that diversity improves BER performance by about 0.5 dB in the threshold- and envelope-compensated receiver 700 of this invention (FIG. 7) instead of degrading performance in the manner known for the hard-decision thresholded S&H receiver (curve 808).

With convolutional coding and Viterbi decoding, the use of threshold and/or envelope compensation together with combining the two classical I&D and S&H detectors is now shown for the first time to provide a new receiver of this invention with a BER performance of more than 3 dB in $E_b/N_0$ over the state of the art existing until now. This improved performance arises from a reduction in FM-click amplitudes, which tends to tame the Viterbi decoder metrics, and the use of null detections (erasures) when a click error is detected. Because of mathematical intractability, simulated curve 828 differs from idealized curve 826 for receiver 700. But curves 828 and 830 prove that the embodiment of this invention (FIG. 7) provides more than 3 dB of improvement over the "optimal" receiver embodiment (FIG. 1) known in the art. Without coding, the improvement in BER performance offered by the method of this invention is less dramatic because the FM-clicks, although reduced in amplitude, are still present to a deleterious degree. Also, there is no way to extend the concept of "null" decisions (erasures) to the uncoded case.

Clearly, in view of these teachings, other embodiments and modifications of this invention may occur readily to those of ordinary skill in the art. Therefore, the invention is to be limited only by the following claims, which comprise all such obvious embodiments and modifications, viewed in conjunction with the above specification and accompanying drawing.

We claim:

1. A machine-implemented method for detecting the bit value corresponding to a data bit-interval of a digital FM receiver limiter-discriminator (LD) output signal, the method comprising the steps of:

(a) integrating the LD output signal over the data bit-interval to produce a first signal representing a first estimate of the corresponding bit value;

(b) producing a first bit detection signal representing a first threshold function of the first signal;

(c) sampling the LD output signal in the data bit-interval to produce a second signal representing a second estimate of the corresponding bit value;

(d) producing a second bit detection signal representing a second threshold function of the second signal; and (e) combining the first and second bit detection signals to produce a final bit detection signal representing a final estimate of the corresponding bit value.

2. The method of claim 1 wherein the first threshold function comprises a hard decision threshold function.

3. The method of claim 2 wherein the second threshold function comprises a hard decision threshold function.

4. The method of claim 3 wherein L represents a predetermined signal level and the first and second threshold functions are:

$$f(z) = \begin{cases} \text{sgn}(z); & |z| \leq L \\ 0; & |z| > L \end{cases}.$$

5. The method of claim 2 wherein L represents a predetermined signal level and the first threshold function is:

$$f(z) = \begin{cases} \text{sgn}(z); & |z| \leq L \\ 0; & |z| > L \end{cases}.$$

6. The method of claim 1 wherein the first threshold function comprises a soft decision threshold function.

7. The method of claim 6 wherein the second threshold function comprises a soft decision threshold function.

8. The method of claim 7 wherein L represents a predetermined signal level and the first and second threshold functions are:

$$f(z) = \begin{cases} z; & |z| \le L \\ 0; & |z| > L \end{cases}.$$

9. The method of claim 6 wherein L represents a predetermined signal level and the first threshold function is:

$$f(z) = \begin{cases} z; & |z| \le L \\ 0; & |z| > L \end{cases}.$$

10. The method of claim 1 wherein the first signal represents LD output signal phase information at the edges of the data bit-interval.

11. The method of claim 1 wherein the second signal represents LD output signal frequency information at the middle of the data bit-interval.

12. The method of claim 1 wherein the second threshold function comprises a hard decision threshold function.

13. The method of claim 1 wherein the second threshold function comprises a soft decision threshold function.

14. The method of claim 1 wherein the final bit detection signal represents the average of the first and second bit detection signals.

15. A machine-implemented method for detecting the bit value corresponding to a data bit-interval of the digital FM receiver limiter-discriminator (LD) output signal corresponding to a digital FM receiver LD input signal having an envelope, the method comprising the steps of:
  (a) integrating the LD output signal over the data bit-interval to produce a first signal representing a first estimate of the corresponding bit value;
  (b) producing a first bit detection signal representing to a first threshold function of the first signal;
  (c) squaring the LD input signal envelope to produce a squared envelope signal;
  (d) multiplying the squared envelope signal by the LD output signal to produce a product signal;
  (e) sampling the product signal in the data bit-interval to produce a second bit detection signal representing a second estimate of the corresponding bit value; and
  (f) combining the first and second bit detection signals to produce a final bit detection signal representing a final estimate of the corresponding bit value.

16. The method of claim 15 wherein the first threshold function comprises a hard decision threshold function.

17. The method of claim 14 wherein L represents a predetermined signal level and the first threshold function is:

$$f(z) = \begin{cases} \text{sgn}(z); & |z| \le L \\ 0; & |z| > L \end{cases}.$$

18. The method of claim 15 wherein the first threshold function comprises a soft decision threshold function.

19. The method of claim 18 wherein L represents a predetermined signal level and the first threshold function is:

$$f(z) = \begin{cases} z; & |z| \le L \\ 0; & |z| > L \end{cases}.$$

20. The method of claim 15 wherein the first signal represents LD output signal phase information at the edges of the data bit-interval.

21. The method of claim 15 wherein the second signal represents LD output signal frequency information at the middle of the data bit-interval.

22. The method of claim 15 wherein the final bit detection signal represents the average of the first and second bit detection signals.

23. A digital FM receiver circuit comprising:
  input means for receiving a digital FM signal representing a plurality of data bit-intervals each having a bit value;
  limiter-discriminator (LD) means coupled to the input means for demodulating the digital FM signal to produce a LD output signal having a value over a data bit-interval;
  integrate-and-dump (I&D) detector means coupled to the LD means for integrating the LD output signal over the data bit-interval to produce a first signal representing a first estimate of the corresponding bit value;
  first threshold means coupled to the I&D detector means for producing a first bit detection signal representing a first threshold function of the first signal;
  sample-and-hold (S&H) detector means coupled to the LD means for sampling the LD output signal in the data bit-interval to produce a second signal representing a second estimate of the corresponding bit value;
  second threshold means coupled to the S&H detector means for producing a second bit detection signal representing a second threshold function of the second signal, and
  combining means coupled to the first and second threshold means for combining the first and second bit detection signals to produce a final bit detection signal representing a final estimate of the corresponding bit value.

24. The circuit of claim 23 wherein the first threshold function comprises a hard decision threshold function.

25. The circuit of claim 24 wherein the second threshold function comprises a hard decision threshold function.

26. The circuit of claim 25 wherein L represents a predetermined signal level and the first and second threshold functions are:

$$f(z) = \begin{cases} \text{sgn}(z); & |z| \le L \\ 0; & |z| > L \end{cases}.$$

27. The circuit of claim 24 wherein L represents a predetermined signal level and the first threshold function is:

$$f(z) = \begin{cases} \text{sgn}(z); & |z| \le L \\ 0; & |z| > L \end{cases}.$$

28. The circuit of claim 23 wherein the first threshold function comprises a soft decision threshold function.

29. The circuit of claim 28 wherein the second threshold function comprises a soft decision threshold function.

30. The circuit of claim 29 wherein L represents a predetermined signal level and the first threshold function is:

$$f(z) = \begin{cases} z; & |z| \le L \\ 0; & |z| > L \end{cases}.$$

31. The circuit of claim 28 wherein L represents a predetermined signal level and the first threshold function is:

$$f(z) = \begin{cases} z; & |z| \le L \\ 0; & |z| > L \end{cases}.$$

32. The circuit of claim 23 further comprising:
decoding means coupled to the combining means for producing a receiver output signal representing an estimate of the corresponding bit value responsive to the bit values in preceding and succeeding bit-intervals.

33. The circuit of claim 23 wherein the second threshold function comprises a hard decision threshold function.

34. The circuit of claim 23 wherein the second threshold function comprises a soft decision threshold function.

35. The circuit of claim 23 wherein the final bit detection signal represents the average of the first and second bit detection signals.

36. A digital FM receiver circuit comprising:
input means for receiving a digital FM signal representing a plurality of data bit-intervals each having a bit value;
limiter-discriminator (LD) means coupled to the input means for demodulating the digital FM signal to produce a LD output signal having a value over a data bit-interval;
integrate-and-dump (I&D) detector means coupled to the LD means for integrating the LD output signal over the data bit-interval to produce a first signal representing a first estimate of the corresponding bit value;
first threshold means coupled to the I&D detector means for producing a first bit detection signal representing a first threshold function of the first signal;
envelope squaring means coupled to the input means for squaring the digital FM signal envelope to produce a squared envelope signal;
multiplier means coupled to the envelope squaring means and to the LD means for multiplying the squared envelope signal by the LD output signal to produce a product signal;
sample-and-hold (S&H) detector means coupled to the multiplier means for sampling the product signal in the data bit-interval to produce a second bit detection signal representing a second estimate of the corresponding bit value; and
combining means coupled to the first and second threshold means for combining the first and second bit detection signals to produce a final bit detection signal representing a final estimate of the corresponding bit value.

37. The circuit of claim 36 wherein the first threshold function comprises a hard decision threshold function.

38. The circuit of claim 37 wherein L represents a predetermined signal level and the first threshold function is:

$$f(z) = \begin{cases} \text{sgn}(z); & |z| \le L \\ 0; & |z| > L \end{cases}.$$

39. The circuit of claim 36 wherein the first threshold function comprises a soft decision threshold function.

40. The circuit of claim 39 wherein L represents a predetermined signal level and the first threshold function is:

$$f(z) = \begin{cases} z; & |z| \le L \\ 0; & |z| > L \end{cases}.$$

41. The circuit of claim 36 further comprising:
decoding means coupled to the combining means for producing a receiver output signal representing an estimate of the corresponding bit value responsive to the bit values in preceding and succeeding bit-intervals.

42. The circuit of claim 36 wherein the final bit detection signal represents the average of the first and second bit detection signals.

\* \* \* \* \*